United States Patent [19]

McIntyre

[11] Patent Number: 5,710,618

[45] Date of Patent: Jan. 20, 1998

[54] PHOTOFINISHING PROCESS CONVERTING OPTICAL DATA TO MAGNETIC DATA

[75] Inventor: Dale Frederick McIntyre, Honeoye Falls, N.Y.

[73] Assignee: Eastman Kodak Company, Rochester, N.Y.

[21] Appl. No.: 413,680

[22] Filed: Mar. 30, 1995

[51] Int. Cl.⁶ .................................. G03B 27/52
[52] U.S. Cl. ................... 355/40; 396/6; 396/319
[58] Field of Search ......................... 355/40, 41, 42; 354/105, 106, 297

[56] References Cited

U.S. PATENT DOCUMENTS

| | | | |
|---|---|---|---|
| 4,684,229 | 8/1987 | Utsugi | 354/106 |
| 5,124,742 | 6/1992 | Yoshikawa | 355/27 |
| 5,194,892 | 3/1993 | Robison | 355/40 |
| 5,231,451 | 7/1993 | Uekusa et al. | 355/29 |
| 5,398,087 | 3/1995 | Kazami et al | 354/21 |
| 5,404,196 | 4/1995 | Terashita et al. | 355/77 |
| 5,459,540 | 10/1995 | Wakabayashi | 354/105 |
| 5,488,445 | 1/1996 | Oi et al. | 354/106 |

FOREIGN PATENT DOCUMENTS 3-146934  6/1991  Japan .............................. G03B 17/24

*Primary Examiner*—R. L. Moses
*Attorney, Agent, or Firm*—Charles E. Snee, III; David A. Howley

[57] ABSTRACT

A process for recording camera and exposure information on photographic film, reading the information during photofinishing and re-recording the information magnetically on the film. According to one feature, disclosed with a single use camera, the process includes the ordered steps of recording camera capabilities on the film and then loading the film into a camera having those capabilities. The process further includes the steps of exposing the film in the camera to a scene, processing the film to develop and print the scene using the recorded camera information and re-recording the information magnetically on the film. According to another feature of the invention, disclosed with multiple use cameras, the camera optically records exposure information on the film. The photofinishing operation then reads the optically recorded information, uses the information and magnetically re-records the information on the film.

6 Claims, 4 Drawing Sheets

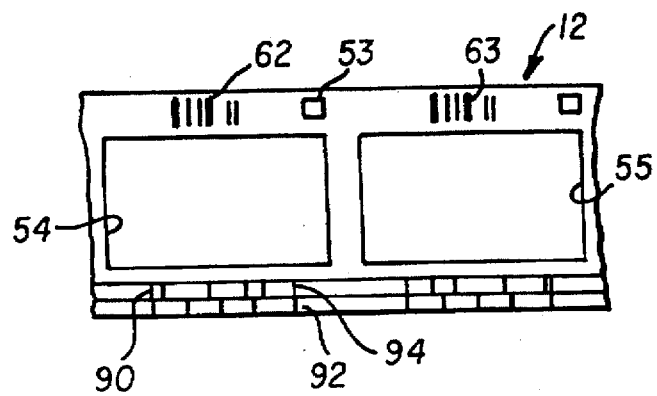
FIG. 9
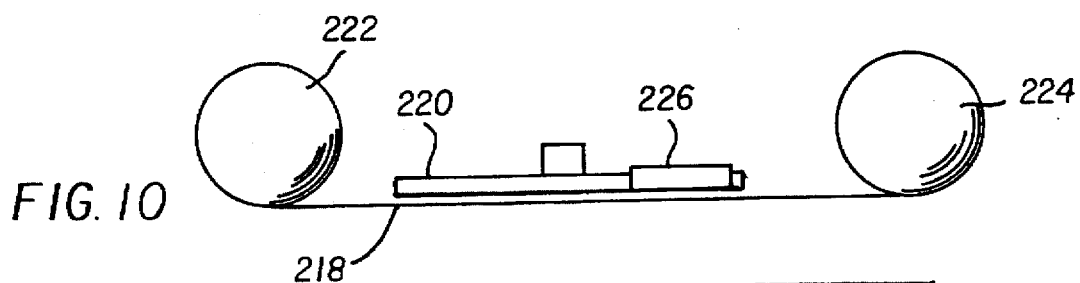
FIG. 10
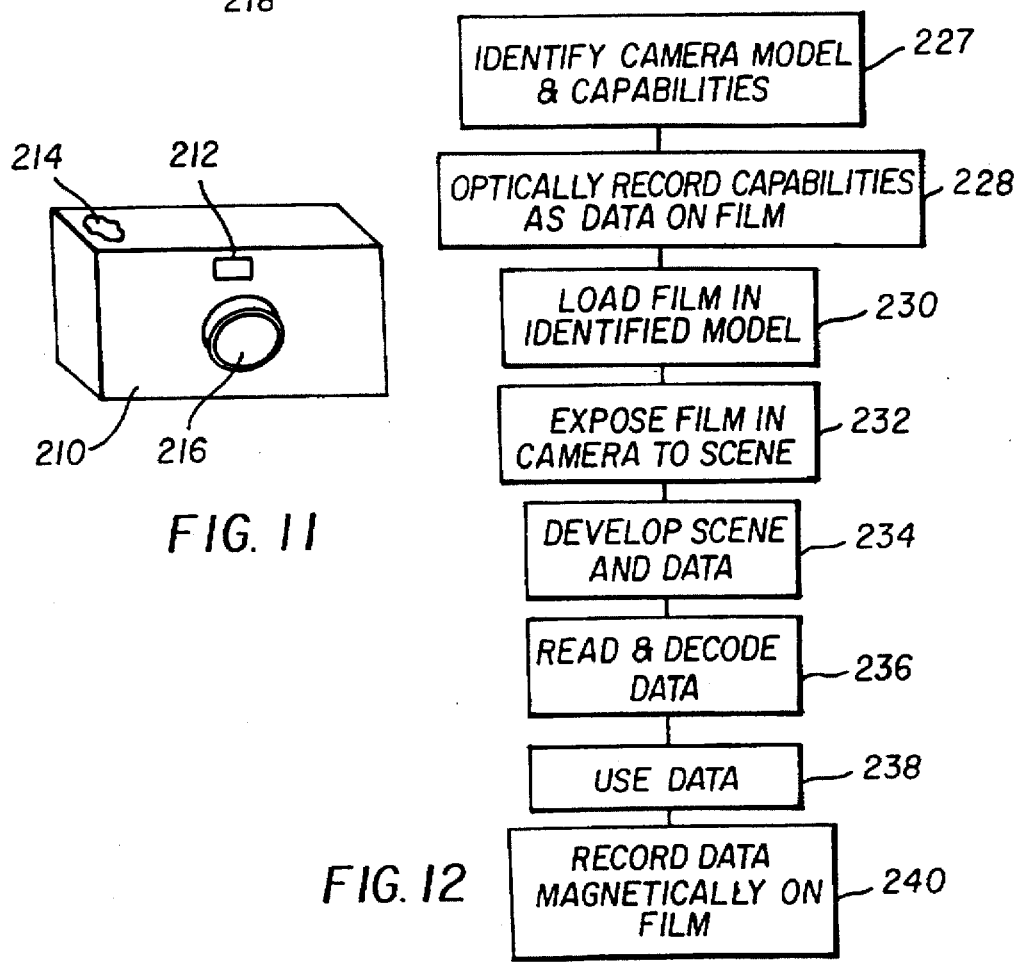
FIG. 11
FIG. 12

5,710,618

PHOTOFINISHING PROCESS CONVERTING OPTICAL DATA TO MAGNETIC DATA

BACKGROUND OF THE INVENTION

1. Field of Invention

The invention relates to photography, and more specifically to processes and apparatus using camera exposure information to improve photofinishing operations.

2. Description of the Prior Art

It is known to coat photographic film with a strip or layer of magnetic material. In some approaches, the layer is transparent, and covers the entire surface of the film. Other approaches use magnetic strips along one or both edges of the film outside the picture area.

It also is known to record information on the film as data that is used to improve photofinishing. Printing parameters might be recorded during a first printing operation and used later for makeovers and reprints. Camera exposure information might be recorded when an exposure is made, and used to enhance photofinishing operations on a frame by frame basis.

An example using data magnetically recorded on film is disclosed in Uekusa et al. U.S. Pat. No. 5,231,451, issued on Jul. 27, 1993. Information concerning the printing operation, or a camera exposure, is recorded on a magnetic strip for use during subsequent photofinishing operations. According to the Uekusa et al. disclosure, the first recording of the data may be under adverse conditions, or the data may deteriorate later. A method and apparatus are provided for increasing the recorded magnetic signal strength by reading the information during photofinishing and re-recording the information on the same or a different track.

PROBLEM SOLVED BY THE INVENTION

Although magnetically recorded data can be rewritten and revised, and may be preferred during a photofinishing operation, it is not necessarily the best technology for recording data in the camera. Magnetically recorded information is erasable, and might be erased inadvertently between the camera and the operation that requires the data. Battery power is another problem. Existing camera systems already demand most of the available power, and additional magnetic circuits and transducers will further increase the burden. Magnetic recording may also depend on substantially uniform movement of the recording medium, a luxury that is not available in all cameras.

In accordance with the disclosure of the present specification, it is expected that many cameras will use simpler and less expensive optical techniques for recording the data on the film, perhaps focusing light from an available source, such as ambient light. Still other cameras, such as single use cameras, will not have any data recording capability. Existing approaches do not provide for alternative recording techniques, permitting optical recording in the camera with magnetic reading of the same data in the photofinishing operation.

SUMMARY OF THE INVENTION

The present invention is directed to overcoming one or more of the problems set forth above. Briefly summarized, according to one aspect of the invention, a process is provided for recording camera information on film even when the camera, such as a single use camera, does not include any data recording capability. The process includes the steps of recording camera information on the film, and then enclosing the film in a camera having those capabilities. According to one embodiment, the camera information is recorded on the film during film finishing. According to another embodiment, the camera information is recorded on the film during pre-winding. More specific features of the process include the further steps of exposing the film in the camera to a photographic scene, and processing the film to develop and print the scene using the recorded information about the camera capabilities. Still more specifically, the recording step optically records the information on the film, the processing step develops an image of the information with the scene, the image is decoded during the processing step to recover the information, and the recovered information is used during printing.

Other features of the invention relate to cameras that record information about camera capabilities and exposure parameters on the film. In this embodiment, information that is recorded optically on the film is decoded and re-recorded magnetically on the film. The film is processed to develop an image of the optically recorded information, the developed image is decoded to recover the information, and the recovered information is recorded magnetically on the film for use in subsequent photofinishing operations. More specifically, the optical recording step records information about a camera exposure in a predetermined area on the film adjacent the exposed scene. Still more specifically, the magnetic recording step a) records a clock pulse on the film in a predetermined magnetic recording area, and b) records the recovered information using pulse position modulation relative to the clock pulse.

The invention permits optimal recording techniques at each step in the photographic process, yet reduces the variety of reading devices required for photofinishing, particularly for prints, reprints and makeovers. Information about camera capabilities and exposure parameters can be recorded on the film optically before or after the film is loaded in the camera. The optical information is then converted to a magnetic format compatible with processing apparatus that prefers magnetic readers.

These and other features and advantages of the invention will be more clearly understood and appreciated from a review of the following detailed description of the preferred embodiments and appended claims, and by reference to the accompanying drawings.

BRIEF DESCRIPTION OF THE DRAWINGS

FIG. 9 is a partial plan view of the film of FIG. 7, depicting magnetically recorded information using a clock pulse and pulse position modulation.

FIG. 10 depicts a film finishing station, according to a first alternative embodiment of the invention, for recording camera information about camera capabilities on the film before the film is loaded into a camera having the recorded capabilities.

FIG. 11 is a perspective view of a single use camera containing the photographic film finished in the station depicted in FIG. 10.

FIG. 12 is a flow diagram outlining a process according to the first alternative embodiment.

DESCRIPTION OF THE PREFERRED EMBODIMENTS

Figure 1:
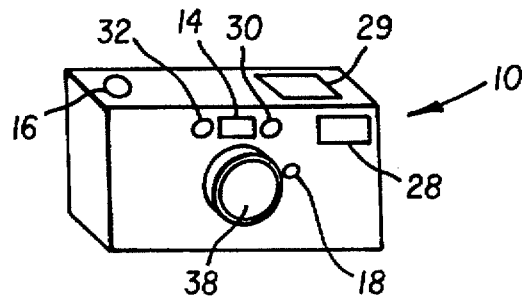
FIG. 1 is a perspective view of a camera, according to a preferred embodiment of the invention, containing photographic film having a magnetic recording area, and including an optical system for recording data on the film pertaining to camera capabilities and exposure parameters.

Referring now to a preferred embodiment of the invention, and beginning with FIGS. 1-4, a multiple-use camera 10 (FIG. 1) is depicted for exposing photographic film 12 (FIGS. 2 and 3) to an intended scene.

Film 12 in this preferred embodiment is supplied in a format similar to existing commercial products often referred to as the thirty five millimeter (35 mm) format. In addition, however, the film includes a thin transparent layer of magnetic material that extends over essentially the same area of the film as the light sensitive emulsion. The magnetic material is approximately one micron thick, which has been found suitable for magnetically recording information as data on the film without interfering with photographic exposure of the coextensive emulsion. This feature is sometimes referred to as magnetics-on-film (MOF), and is provided for recording data on the film at various stages ranging from exposure of the film in a camera through first-time and subsequent photofinishing operations.

Information recorded magnetically on film might pertain to camera capabilities, exposure conditions, formats and photofinishing parameters. According to this preferred embodiment, however, the camera 10 does not include magnetic recording capability. Instead, as described more fully hereinafter, camera and exposure information is recorded on the film optically. The optically recorded information is developed with the photographed scene, and the developed image is decoded to recover and use the information during concurrent photofinishing operations, such as printing. The recovered information is recorded on the film again, this time magnetically, for subsequent operations such as makeovers and reprints.

The camera 10 is aimed through a viewfinder 14 (FIG. 1) at an intended photographic scene. An actuation element 16 is then depressed to initiate several related operations that ready the camera for the exposure, expose the film to the scene, and reset the camera for the next successive exposure.

Scene or ambient light is sensed by a photocell 18 (FIG. 1), which is part of an automatic exposure control circuit 20 (FIG. 4) coupled to a logic and control device 22. The sensed light level is used to determine shutter speed and aperture size according to a program or look-up table stored in a memory module 24. It also is used in a similar manner to determine if electronic flash circuit 26 should be charged for firing flash tube 28 to provide full or fill flash. The logic and control unit 22 sets the aperture to the proper size, initiates charging of the flash circuit, when required, opens the shutter for the appropriate duration and fires the flash, all according to a properly timed sequence. It also stores information in memory 24 about these settings and events for optically recording the stored information as data on the film. A time and date may be stored with the information corresponding to the time and date of the exposure.

Panel 29 displays information about the camera settings and functions for the interest of the camera operator. Exposure parameters set automatically by the camera are displayed, and can be changed manually. Manual settings, like automated settings, are stored in memory 24.

Figure 2:
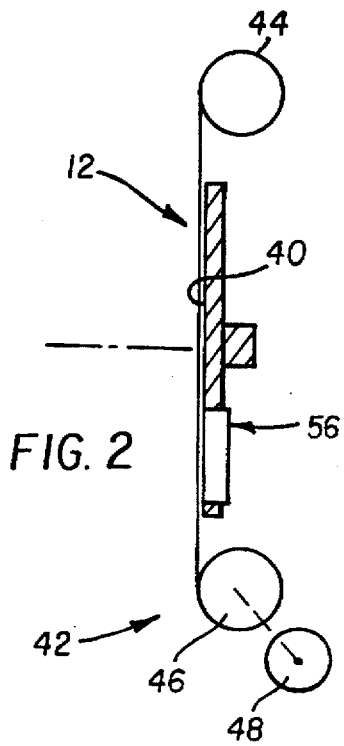
FIG. 2 is a cross-sectional view of the film, a pressure platen supporting the film in an exposure position, and a source of light for exposing the film to the data.
Figure 3:
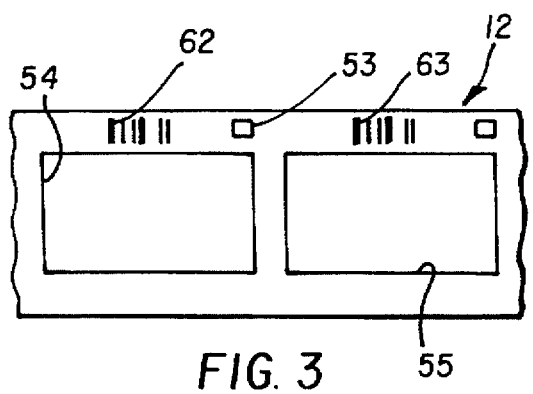
FIG. 3 is a partial plane view of the film representing a latent image of the data exposed on the film by the light source of FIG. 2.
Figure 4:
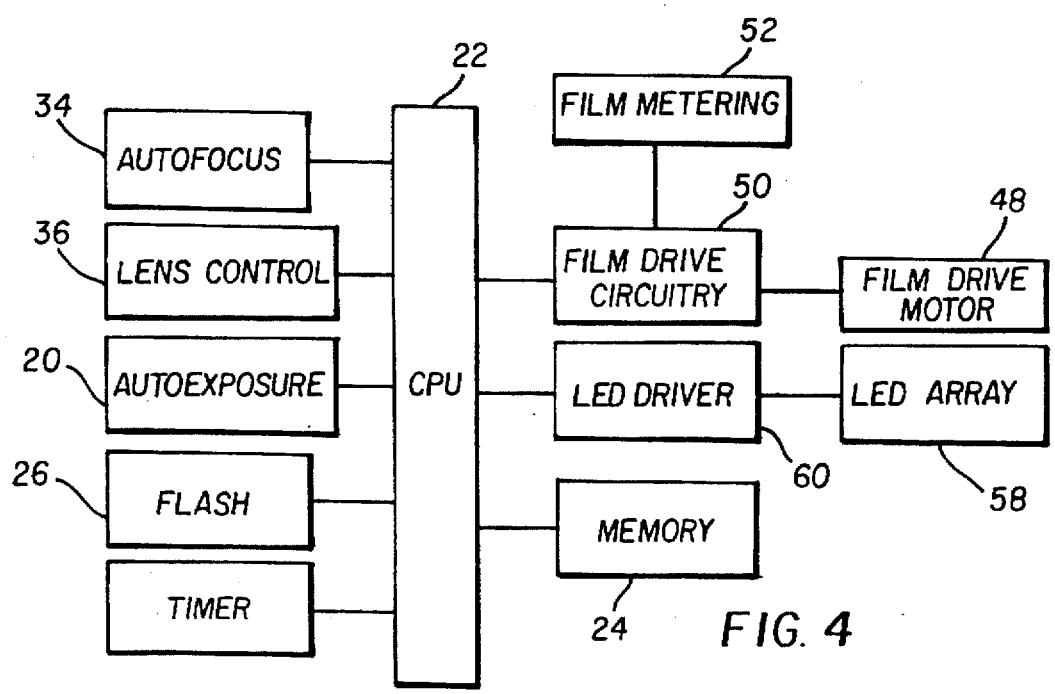
FIG. 4 is a block diagram depicting systems in the camera of FIG. 1 for establishing exposure parameters and for recording representations of such parameters on the film.
Figure 5:
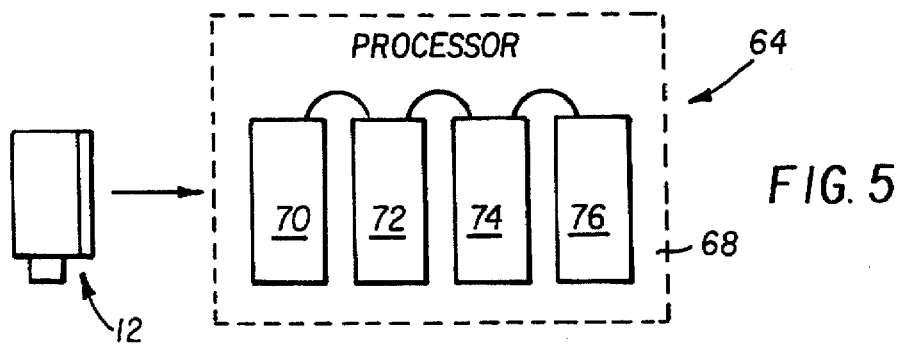
FIG. 5 is a block diagram representing film processing to develop the film, converting latent images into perceptible images on the film.

Spaced devices 30 and 32 (FIG. 1) operate with autofocus circuit 34 (FIG. 4), and the logic and control unit 22, to determine the distance from the camera to a selected subject in the photographic scene. Devices 30 and 32 may include an emitter and a sensor that determine distance based on triangulation techniques, or other known devices for determining distance. The logic and control unit 22 then sets the focus of the camera 10, through lens control 36 (FIG. 4), by adjusting optical elements 38 (FIG. 1) until the scene image is focused sharply at the exposure plane 40 (FIG. 2). Again, the distance information is stored in memory 24 so it can be recorded on the film.

After a scene exposure, the film is transported by a film advancing mechanism 42 from a supply chamber 44, through the exposure plane 40, and into a take-up chamber 46. Logic and control unit 22 operates through a film drive motor 48, drive circuitry 50, metering mechanism 52, and sprocket holes or film metering perforations 53 (FIG. 3), to meter the film sequentially into and through the exposure plane, one frame after another. Although the image frames are not visible at this point, they are defined by latent images formed during the exposures, and are depicted at 54 and 55 in FIG. 3.

In this preferred embodiment, it is during movement of the film between exposures that the information collected in memory 24 is recorded on the film. A film writing device 56 includes a plurality of light emitting devices (LEDs) 58 (FIG. 4) arranged in a linear array perpendicular to the direction of film movement along one edge of the film. The LEDs 58 are selectively energized by logic and control unit 22, through an LED driver 60, to record the information as digital data 62 and 63 (FIG. 3) between the metering perforations 53. This type of recording is sometimes referred to as the data back method, and exposes the film through the back of the film with illumination sources that are set into the pressure plate of the camera. The recorded data is associated with a respective frame in a predetermined position relative to that frame, and represents the exposure parameters used when the frame was exposed. Data 62, for example, is located adjacent frame 55, and records the shutter speed, aperture size, subject distance, time and date, and the fact that fill flash was used when the frame was exposed.

The data recording format preferably is a bar code that represents the information by the relative width of a series of light and dark stripes or bars. Of course other approaches might be employed, including geometric, color and position based codes. Although the data format might be human readable, it also is machine readable. Of course, in either case, it must first be developed from the latent image recorded by the camera to a perceptible image, a film negative in this preferred embodiment.

Other methods of recording the information also may be used, including electroluminescent material, as disclosed in U.S. patent application Ser. No. 08/356,814, filed Dec. 15, 1994, in the name of Paul Teremy et al. The disclosure of this last mentioned application hereby is incorporated by reference into the present specification.

Figure 6:
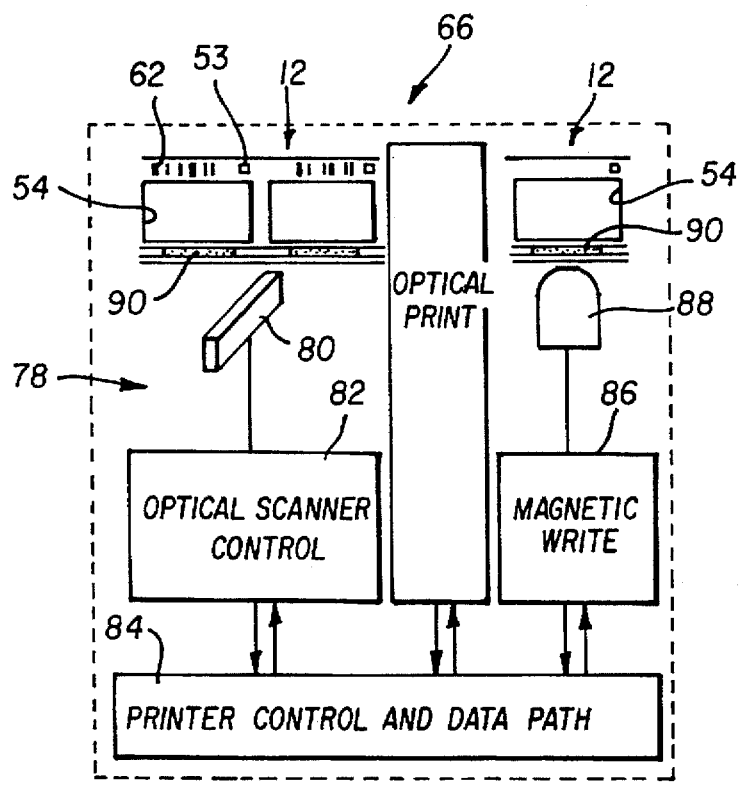
FIG. 6 is a block diagram representing a printing operation, including scanning the optically recorded data and magnetically rewriting the data on the film, according to the preferred embodiment.
Figure 7:
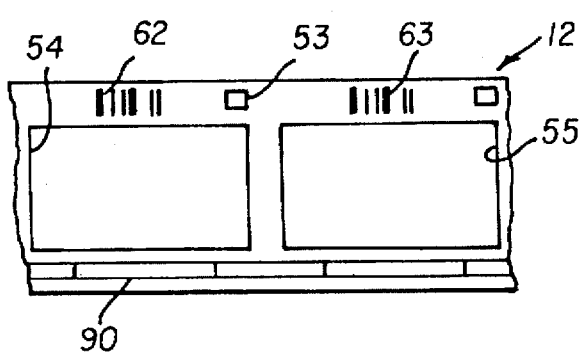
FIG. 7 is a partial plan view of the film depicting a magnetic recording area in a predetermined location along one edge.
Figure 8:
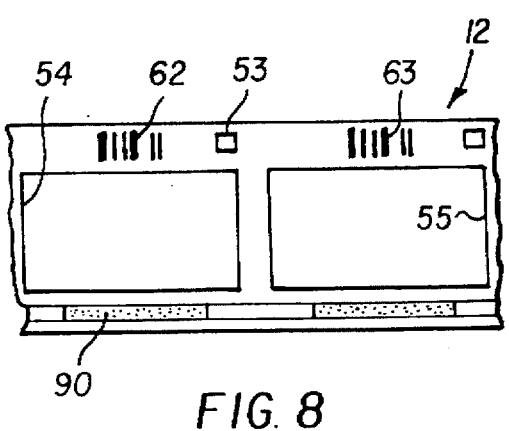
FIG. 8 is a partial plan view of the film of FIG. 7, depicting magnetic information recorded in the magnetic area.

Referring now to FIGS. 5–8, photofinishing steps are represented including film processing 64 (FIG. 5) and film printing 66 (FIG. 6). Film processing is completed in well known commercially available equipment 68, including a plurality of tanks 70, 72, 74 and 76 that contain appropriate chemicals for developing the scene image and data. Although the developed images and data marks are relatively small, and are negative images with complementary colors, they are perceptible to the human eye and readable by optoelectronic devices.

Additional disclosure of a photofinishing process suitable for use with the present invention is disclosed in commonly assigned, copending U.S. patent application Ser. No. 08/241,986, entitled RANDOM BATCH PHOTOFINISHING, filed May 12, 1994, in the names of Jack DeMarti et al. The disclosure of this last mentioned application hereby is incorporated by reference into the present specification.

After processing and during printing, in this preferred embodiment, the data marks 62 are read by an optical scanner 78, including a linear array 80 of charge coupled devices (CCDs), and scanner control 82. The scanned information is decoded in printer control 84 and used during the printing to control printing parameters. The picture format, whether standard, telephoto or wide angle, might be used, for example, to set the printer optics. Knowledge that fill flash or a wide aperture was used, might result in printing exposure adjustments. The date of the exposure is another example, and might be used to adjust for raw stock and latent image keeping.

Also during printing, preferably when the film is moving between frames, the decoded information is recorded magnetically on the film using a magnetic driver 86 and magnetic recording head 88. The magnetically recorded information is positioned in a predetermined area 90 having a known relationship to the corresponding image frame 54. Thus the information recorded magnetically in area 90 includes essentially the same information recorded optically by marks 62, although other information may be added regarding parameters used during the printing operation.

FIG. 9 discloses additional features of the format used in the preferred embodiment for the magnetic recording. The information is recorded digitally using pulse position modulation relative to a clock pulse. The clock pulse is recorded in a first strip 92, included in area 90, and the information is recorded in a second strip 94 running adjacent the first strip. An information pulse that is positioned beyond the midpoint between two clock pulses represents a logical one, while an information pulse that is before the midpoint represents a logical zero. The ones and zeros are bits and form parts of characters, or bytes, and words, in a manner well known in digital recording.

DESCRIPTION OF A FIRST ALTERNATIVE EMBODIMENT

Referring now to FIGS. 10–12, an alternative embodiment of the invention is depicted for use with a single use camera 210 that does not include any data recording capability. The camera depicted is a basic camera having a view finder 212 shutter release 214 and stationary optics 216. Other single use cameras, however, include additional features such as flash and automatic exposure control. Additionally, some single use cameras are designed for wide angle or panoramic exposures, while others are intended for close up or telephoto exposures.

According to this embodiment, camera capabilities are recorded on the film during its manufacture, preferably during film finishing. The camera model is identified, including its features and capabilities, and this information is recorded on the film as data. The film is loaded into a camera of the identified model having the previously recorded capabilities.

FIG. 10 depicts the finishing operation, where the information is recorded as data on the film. The film 218 runs over a platen 220 from a supply roll 222 to a take up roll 224. The camera information is written by a linear array of light emitting diodes (LEDs) 226 at predetermined positions relative to metering perforations similar to those depicted in FIG. 3. Since the positions of the exposed scenes also are known relative to the metering perforations, the data will be located in a predetermined position relative to the scene frames. Of course the camera features don't change between exposures, and it might be suitable to write the information only once for each film roll. In this preferred embodiment, however, the information is written adjacent each frame where photofinishing equipment would expect to find such information from other camera types and models. Other variations might include magnetic or other recording techniques suitable for recording information on film including a magnetic layer.

The process is depicted as a flow diagram in FIG. 12. A camera model is identified at step 227, and its features and capabilities are determined. The features and capabilities are optically recorded on a film strip as color or gray scale marks in step 228, and the film strip is loaded into a camera of the identified model at step 230. The film is exposed in the camera at step 232, and the data marks on the film are developed with the scene, in conventional processing equipment at 234. The developed data is scanned and decoded at 236 and used during photofinishing at 238. Also during photofinishing, preferably during printing, the data is re-recorded magnetically on the film in predetermined positions relative to the appropriate corresponding picture frame, step 240.

DESCRIPTION OF SECOND ALTERNATIVE EMBODIMENT

Figure 13:
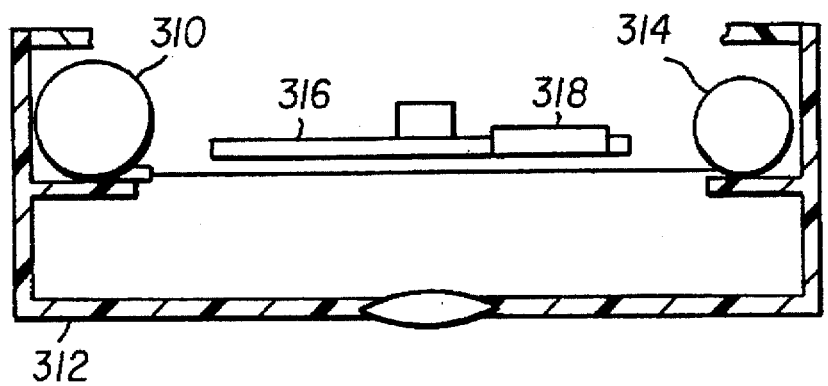
FIG. 13 is a cross-sectional view of a single use camera, according to a second alternative embodiment of the invention, including a recording device for recording camera data on the film during pre-winding.
Figure 14:
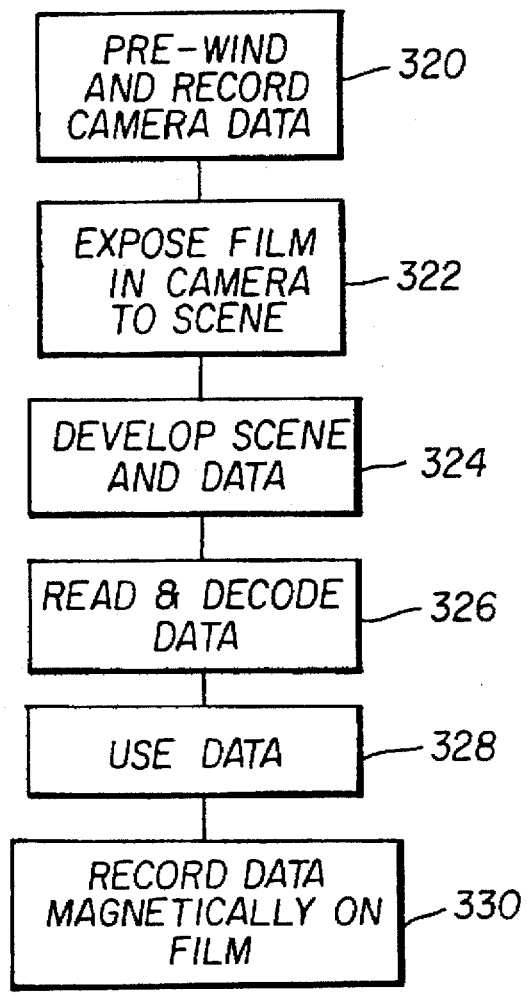
FIG. 14 is a flow diagram outlining a process according to the second alternative embodiment.

A second alternative embodiment of the invention is depicted in FIGS. 13 and 14. This embodiment is applied to a single-use camera, similar to the first alternative embodiment, but the information is recorded on the film during assembly of the film into the camera, preferably during an operation referred to as pre-winding. Pre-winding refers to an assembly operation after the film is placed in the camera, before the camera is closed. Film, usually in a cartridge, is loaded into a supply chamber of the camera and is then advanced from the supply chamber across an exposure position to a take-up chamber. The camera is then closed, with the pre-wound film inside, and sold, usually as a single use camera. When the camera is operated to expose the film, one frame after another, the film is returned to the cartridge in the supply chamber.

Referring to FIG. 13, film contained in a cartridge 310 is positioned in the supply chamber of a camera 312 and advanced by pre-winding from the supply chamber 310 into a take-up chamber 314. This pre-winding step is conventional in single use cameras. According to the present invention, however, camera information, including features and capabilities, is recorded on the film during the pre-winding step. A platen 316, including a writing device 318, is positioned adjacent the film end exposes the film to the data during the pre-winding operation. The writing device is similar to the LED array already described in connection with the other embodiments. Magnetic and other technologies also can be used to record the data, assuming the film includes a magnetic layer, as previously described. After pre-winding, the film is enclosed in the camera by closing the camera cover door.

The process is depicted as a flow diagram in FIG. 14. Information about camera features and capabilities is recorded on the film during pre winding, step 320. The film is exposed in the camera at 322, and the data marks on the film are developed with the scene, in conventional processing equipment at 324. The developed data is scanned and decoded at 326 and used during photofinishing at 328. Also during photofinishing, preferably during printing, the data is re-recorded magnetically on the film in predetermined positions relative to the appropriate corresponding picture frame, step 330.

While the invention is described in connection with preferred and alternative embodiments, other modifications and applications will occur to those skilled in the art. The claims should be interpreted to fairly cover all such modifications and applications within the true spirit and scope of the invention.

| Reference No. | Part |
|---|---|
| 10. | Camera |
| 12. | Film |
| 14. | Viewfinder |
| 16. | Actuation element |
| 18. | Photocell |
| 20. | Exposure, control circuit |
| 22. | Logic & control device |
| 24. | Memory module |
| 26. | Flash circuit |
| 28. | Flash tube |
| 29. | Display panel |
| 30. | Autoranging Device |
| 32. | Autoranging Device |
| 34. | Autofocus circuit |
| 36. | Lens control |
| 38. | Optical elements |
| 40. | Exposure plane |
| 42. | Film advancing mechanism |
| 44. | Supply chamber |
| 46. | Take-up chamber |
| 48. | Drive motor |
| 50. | Drive circuitry |
| 52. | Metering mechanism |
| 53. | Metering perforations |
| 54. | Image frame |
| 55. | Image frame |
| 56. | Writing device |
| 58. | LEDs |
| 60. | LED driver |
| 62. | Digital data |
| 63. | Digital data |
| 64. | Film processing |
| 66. | Film printing |
| 68. | Processing equipment |
| 70, 72, 74 and 76. | Tanks |
| 78. | Optical scanner |
| 80. | Linear array |
| 82. | Scanner control |
| 84. | Printer control |
| 86. | Magnetic driver |
| 88. | Magnetic recording head |
| 90. | Magnetic area |
| 92. | Clock pulse |
| 94. | Information pulse |
| 210. | Camera |
| 212. | Viewfinder |
| 214. | Shutter release |
| 216. | Optics |
| 218. | Film |
| 220. | Platen |
| 222. | Supply roll |
| 224. | Take up roll |
| 226. | LEDs |
| 228–240. | (even only) Process steps |
| 310. | Film cartridge |
| 312. | Camera |
| 314. | Take-up chamber |
| 316. | Platen |
| 318. | Writing device |
| 320–330. | (even only) Process steps |

What is claimed is:

1. A method of loading a camera having a film supply chamber and a film take-up chamber, comprising steps of:

loading a photographic filmstrip into the supply chamber;

prewinding the filmstrip from the supply chamber to the take-up chamber;

during the prewinding, recording onto the filmstrip information about features and capabilities of the camera; and after the prewinding and recording, closing the camera.

2. A method according to claim 1, wherein the recording is optical, further comprising steps of:

exposing the filmstrip in the camera to a scene;

processing the filmstrip to develop the recorded information; and making prints of the scene using the recorded information.

3. A method according to claim 1, wherein the filmstrip includes a magnetic recording layer and the recording is magnetic.

4. A method according to claim 1, wherein the recording is optical, further comprising steps of:

exposing the filmstrip in the camera to a scene;

processing the filmstrip to develop the recorded information;

decoding the developed, recorded information; and making prints of the scene using the decoded information.

5. A method according to claim 1, wherein the recording is optical and the filmstrip includes a magnetic recording layer, further comprising steps of:

exposing the filmstrip in the camera to a scene;

processing the filmstrip to develop the recorded information;

decoding the developed, recorded information;

magnetically recording the decoded information onto the magnetic recording layer of the filmstrip; and making prints of the scene using the decoded information.

6. A method according to claim 5, wherein the magnetic recording occurs during making prints.

* * * * *